United States Patent [19]

Hishida et al.

[11] 4,430,182

[45] Feb. 7, 1984

[54] MANUFACTURE OF DISPLAY ELECTRODE LAYERS IN ELECTROCHROMIC DISPLAY DEVICES

[75] Inventors: Tadanori Hishida, Kashihara; Hiroshi Kuwagaki, Joyo; Katubumi Koyanagi; Yasuhiko Inami, both of Nara, all of Japan

[73] Assignee: Sharp Kabushiki Kaisha, Osaka, Japan

[21] Appl. No.: 322,243

[22] Filed: Nov. 17, 1981

[30] Foreign Application Priority Data

Nov. 21, 1980 [JP] Japan ................................ 55-165201

[51] Int. Cl.$^3$ ............................................. C23C 15/00
[52] U.S. Cl. ................................. 204/192 P; 156/643; 204/192 E; 350/357; 427/70
[58] Field of Search ................ 204/192 P, 192 E; 427/70; 156/643; 350/357

[56] References Cited

U.S. PATENT DOCUMENTS

| 4,027,192 | 5/1977 | Hanak | 204/192 P |
|---|---|---|---|
| 4,060,426 | 11/1977 | Zinchuk | 204/192 P |
| 4,149,885 | 4/1979 | Luo et al. | 427/70 |
| 4,225,380 | 9/1980 | Wickens | 156/657 |
| 4,253,741 | 3/1981 | Nakauchi et al. | 350/357 |
| 4,253,742 | 3/1981 | Morita | 350/357 |
| 4,258,984 | 3/1981 | Beni et al. | 204/192 P |
| 4,269,919 | 5/1981 | Kuehnle | 204/192 P |
| 4,341,010 | 7/1982 | Tijburg et al. | 156/657 |

Primary Examiner—Arthur P. Demers
Attorney, Agent, or Firm—Birch, Stewart, Kolasch & Birch

[57] ABSTRACT

A method for preparing display electrode layers in an electrochromic display device, comprises the steps of forming a transparent, conductive film on a substrate, forming an insulating film over the entire surface of the transparent, conductive film forming a mask at portions on the insulating film other than a display pattern and a lead-in electrode, removing the insulating film at the display pattern and the lead-in electrode, forming an electrochromic material layer over entire portions other than the lead-in electrode, and removing the mask formed on the insulating film. Preferably, an inorganic resist is used to form the mask at the portions on the insulating film.

6 Claims, 7 Drawing Figures

MANUFACTURE OF DISPLAY ELECTRODE LAYERS IN ELECTROCHROMIC DISPLAY DEVICES

BACKGROUND OF THE INVENTION

The present invention relates to electrochromic display devices and, more particularly, to a method for preparing display electrode layers in electrochromic display devices.

The electrochromic display devices are of the type using electrochromic material which undergoes reversible color changes upon the application of an electric field. In connection with an example of electrode structures in such display devices, see Nakauchi et al U.S. Pat. No. 4,253,741 issued Mar. 3, 1981 and entitled "Electrochromic Display Device", for example.

FIG. 1 shows a cross-sectional view of an ideal electrode structure at a display portion in the electrochromic display devices. The display electrode layers include a transparent substrate 1 made of glass or the like, a transparent, conductive film 2 made of $In_2O_3$ or the like, an insulating film 3 made of $SiO_2$, $Si_3N_4$, $MgF_2$ or the like, and an electrochromic film 4 made of $WO_3$ or the like.

It is preferable that the transparent, conductive film 2 is covered by either of the insulating film 3 and the electrochromic film 4 in such a manner that the insulating film 3 neither overlaps with nor separates from the electrochromic film 4.

Conventionally, the display electrode layers are prepared with etching techniques using lift-off method. In this process, directly on the electrochromic film 4, an organic resist is printed in which heat is applied to obtain the insulating film 3. Hence, the electrochromic film 4 may react upon the organic resist coating.

The organic resist coating as called herein is featured in that the principal constituent thereof is a resin material, the organic resist is baked at about 80° C., and it can be removed with an organic solvent. The resist may be carbonized when heated above about 150° C. although the carbonization degree depends on the type of organic resist.

Upon being heated, the electrochomic film 4 may contract to thereby change its thickness or may be contaminated. Since the electrochromic film 4 may be annealed with heat applied to thereby crystallize, the display characteristics of the film 4 thus prepared are reduced. Unless heat is applied to prepare the insulating film 3, the insulating properties of the insulating film 3 are worse.

Therefore, it is desired that the display electrode layers be prepared without damaging their electro-optical properties.

SUMMARY OF THE INVENTION

Accordingly, it is an object of the present invention to provide an improved method for preparing display electrode layers in an electrochromic display device.

It is another object of the present invention to provide an improved method for preparing display electrode layers having uniform thickness in an electrochromic display device.

Briefly descirbed, in accordance with the present invention, a method for preparing display electrode layers in an electrochromic display device, comprises the steps of forming a transparent, conductive film on a substrate, forming an insulating film over the entire surface of the transparent, conductive film, forming a mask at portions on the insulating film other than a display pattern and a lead-in electrode, removing the insulating film at the display pattern and the lead-in electrode, forming an electrochromic material layer over entire portions other than the lead-in electrode, and removing the mask formed on the insulating film. Preferably, an inorganic resist is used to form the mask at the portions on the insulating film. It is featured in that carbonization is prevented when the resist is baked above about 350° C., and the resist is removed with water, dilute acid or the like.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
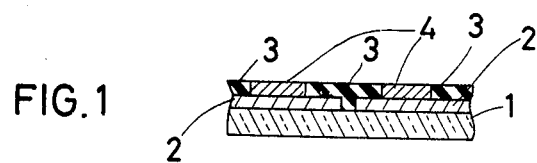
FIG. 1 shows a cross-sectional view of ideal display electrode layers in an electrochromic display device.
Figure 2A:
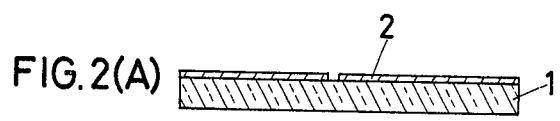
FIGS. 2(A) through 2(F) show cross-sectional views for explanation of steps of making display electrode layers according to the present invention.

A method for preparing display electrode layers in an electrochromic display device according to the present invention is as follows:

Step 1 referring to FIG. 2(A):

Over the entire surface of a transparent substrate 1 made of glass or the like, a material such as $In_2O_3$ is evaporated to form a transparent, conductive film 2. An etching resist is screen printed in a shape of an electrode pattern. A preferred example of the etching resist is of the type known by the commercial name ER-401 B produced by Tamura Seisakusho, Japan. Baking is conducted at about 80° C. for about 10 minutes. An acid etching solution ($HCl+FeCl_3$) is applied for etching. The transparent, conductive film 2 is shaped as the electrode pattern.

Figure 2B:
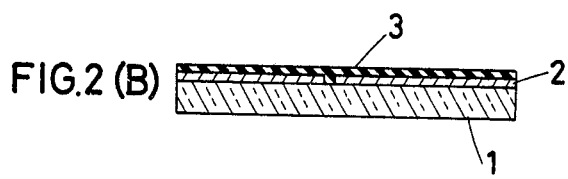

Step 2 referring to FIG. 2(B):

An insulating film 3 is formed over the entire surface of the substrate 1 and the film 2. A preferred example of the insulating film 3 is an $Si_3N_4$ film or an $SiO_2$ film with a thickness of about 1,000 Å grown by Chemical Vapor Deposition (CVD) at about 450° C. The $Si_3N_4$ film can be sputtered. The $SiO_2$ film can be sputtered or evaporated, or selected to be a film prepared by commercial name Ohka Coat Diffusion-Source (OCD) produced by Tokyo Ohka Kogyo Co., Ltd., Japan. The OCD is a liquid which is coated and changed to $SiO_2$ under thermal decomposition with a solution of $Si(OH)_4$.

Figure 2C:
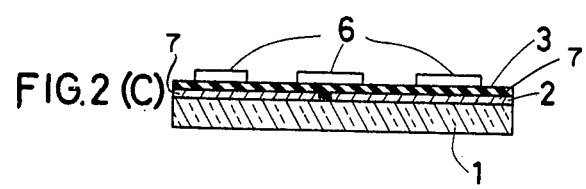

Step 3 referring to FIG. 2(C):

Other than display segments, and lead-in electrodes 7 connected to driver terminal means, an inorganic resist 6 is screen printed. The resist 6 is pre-baked at about 150° C. for about 1 hour. It is baked at about 350° C. for about 1.5 hour in a muffle furnace. The reason why the resist 6 is forced to gas with the heat of about 350° C. is to eliminate the influence of the gas at step 5 in which $WO_3$ is evaporated. A preferred example of the inorganic resist 6 is of the type known as MSN-42B (Minetch Corporation, U.S.A.) or varniphite S-3 (Nippon Graphite, Japan).

Figure 2D:
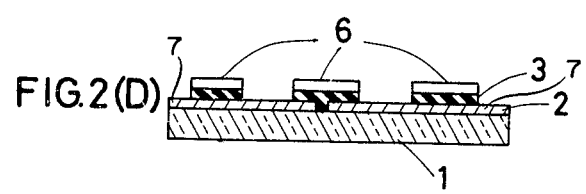

Step 4 referring to FIG. 2(D):

The insulating film 3 which is disposed at the display segment portions and the lead-in electrodes 7 is dry etched with a CF$_4$ gas under the condition of about 150W, gas pressure of about 60 mtorr, and a 5-minute period. The CF$_4$ gas does not damage the transparent, conductive film 2 of In$_2$O$_3$.

Figure 2E:
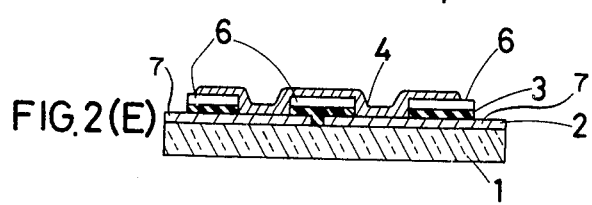

Step 5 referring to FIG. 2(E):

After the lead-in electrodes 7 are masked by a metal, an electrochromic material such as WO$_3$ is evaporated over the remaining positions.

Figure 2F:
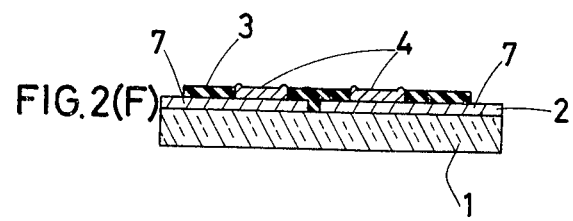

Step 6 referring to FIG. 2(F):

The inorganic resist 6 is removed with dilute hydrochloric acid or water to obtain the display electrodes.

The inorganic resist as referred to hereinabove and used in step 3 features a principal constituent which is a filler such as an inorganic material powder, carbon, metal powder or the like. Any solvents and resin materials thereof are baked and the resist is not carbonized so as to remain the only filler, when heated above about 300° C. The resist can be removed with water, dilute acid or the like.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for preparing display electrode layers in an electrochromic display device, comprising the steps of:
    forming a transparent, conductive film on a substrate;
    forming an insulating film over the entire surface of the transparent, conductive film;
    forming a mask of inorganic resist at portions on the insulating film other than a display pattern and a lead-in electrode;
    removing the insulating film at the display pattern and the lead-in electrode;
    forming an electrochromic material layer over entire portions other than the lead-in electrode; and
    removing the mask formed on the insulating film.

2. The method of claim 1, wherein the insulating film is selected from an SiO$_2$ layer prepared by Chemical Vapor Deposition, sputtering method, evaporation method, and thermal decomposition, and an Si$_3$N$_4$ layer prepared by Chemical Vapor Deposition or sputtering method.

3. The method of claim 1, wherein the step of removing the insulating film is a dry etching process.

4. The method of claim 1, wherein the step of forming the mask comprises screen printing the inorganic resist on the portions of the insulating film and baking.

5. The method of claim 4, wherein the inorganic resist includes properties wherein carbonization is prevented when the resist is baked above about 300° C., and the resist is removed with water, dilute acid or the like.

6. Display electrode layers in an electrochromic display device prepared by claim 1.

* * * * *